(12) United States Patent
Bhiwankar et al.

(10) Patent No.: US 7,989,534 B2
(45) Date of Patent: Aug. 2, 2011

(54) POLYMER-CLAY NANOCOMPOSITES AND METHODS OF MAKING THE SAME

(75) Inventors: Nikhil N. Bhiwankar, Charlton, MA (US); Robert A. Weiss, Storrs, CT (US)

(73) Assignee: University of Connecticut, Farmington, CT (US)

( * ) Notice: Subject to any disclaimer, the term of this patent is extended or adjusted under 35 U.S.C. 154(b) by 488 days.

(21) Appl. No.: 11/777,114

(22) Filed: Jul. 12, 2007

(65) Prior Publication Data

US 2008/0039570 A1  Feb. 14, 2008

Related U.S. Application Data

(60) Provisional application No. 60/830,757, filed on Jul. 12, 2006.

(51) Int. Cl.
*C08K 3/34* (2006.01)
(52) U.S. Cl. .......................... 524/445; 524/447
(58) Field of Classification Search .................. 524/445, 524/447
See application file for complete search history.

(56) References Cited

U.S. PATENT DOCUMENTS

| | | | |
|---|---|---|---|
| 3,870,841 A | | 3/1975 | Makowski et al. |
| 4,173,695 A * | 11/1979 | Brenner et al. ............ 525/331.8 |
| 5,552,469 A * | 9/1996 | Beall et al. ..................... 524/445 |
| 6,051,643 A * | 4/2000 | Hasegawa et al. ............ 524/445 |
| 6,673,860 B1 * | 1/2004 | Grutke et al. ................. 524/445 |
| 6,831,123 B1 * | 12/2004 | Chisholm et al. ............ 524/445 |
| 7,244,781 B2 * | 7/2007 | Bortnick et al. .............. 524/445 |
| 2005/0059765 A1 * | 3/2005 | Finch et al. ................... 524/430 |

OTHER PUBLICATIONS

Bhiwankar, et. al., "Melt-Intercalation of Sodium-Montmorillonite with Alkylamine and Quarternized Ammonium Salts of Sulfonated Polystyrene Ionomers" Jul. 14, 2005, Polymer 46, pp. 7246-7254.
Bhiwankar, et. al., "Melt Intercalation/Exfoliayion of Polystyrene-Sodium-Montmorillonite Nanocomposites Using Sulfonated Polystrene Ionomer Compatibilizers" Aug. 14, 2006, Polymer 47, pp. 6684-6691.
Shah, et. al., "Nanocomposites from Poly(Ethylene-co-methacrylic acid) Ionomers: Effect of Surfactant Structure on Morphology and Properties" Jan. 29, 2005, Polymer 46, pp. 2646-2662.
Parent, et al., "Isobutylene-based Ionomer Composites: Siliceous Filler Reinforcement", Oct. 12, 2004, Polymer 46 pp. 8091-8096.
Barber, et. al., "Poly(Ethylene Terephthalate) Ionomer Based Clay Nanocomposites Produced via Melt Extrusion", Jun. 13, 2005, Polymer 46, pp. 6706-6714.
Chisholm, et al., "Nanocomposites Derived from Sulfonate Poly(butylene terephthalate)", Macromolecules 2002, 35,I pp. 5508-5516.
Barber, et al., "Application of Ionomeric Compatiblizer for Organically—Modified Montmorillonite/PET Nanocomposites", Polymer Materials: Science and Engineering (American Chem. Soc.), pp. 241-242.
Lee, et al., "Synthesis and Characterization of Polyethylen-Based Ionomer Nanocomposites", Polymer 46, pp. 5040-5049.

(Continued)

*Primary Examiner* — Satya Sastri
(74) *Attorney, Agent, or Firm* — Cantor Colburn LLP

(57) ABSTRACT

Polymer-clay nanocomposites and methods of making the same are provided. In an embodiment, a polymer-clay nanocomposite comprises a non-metal salt of an ionomer and a nanostructured layered clay. An example of the ionomer is a tetra-octyl ammonium salt of sulfonated polystyrene, and an example of the clay is sodium-montmorillonite.

31 Claims, 10 Drawing Sheets

OTHER PUBLICATIONS

M. Alexandre et al., Chemistry of Materials, 2001, vol. 13, No. 11, pp. 3830-3832.

Edited by R. Gachter and H. Muller, Plastics Additives Handbook, Chapter 9 Fillers and Reinforcements, pp. 525-635.

Wang et al., Langmuir, 21, 2613 (2005).

Blanton et al., Advances in X-ray Analysis, 42, 562 (2000).

Chisholm et al., Macromolecules, 35, 5508 (2002).

Barber et. al., Polymer, 46, 6706 (2005).

Fitzgerald et al., "The Effect of Diluents on the Ionic Interactions in Sulfonated Polystyrene Ionomers", Journal of Polymer Science: Part C: Polymer Letters, vol. 24, 263-268 (1996).

Weiss et al., "Control of Ionic Interactions in Sulfonated Polystyrene Ionomers by the Use of Alkyl-Substituted Ammonium Counterions", Journal of Applied Polymer Science, vol. 29, 2719-2734 (1984).

Dennis et al., "Effect of Melt Processing Conditions on the Extent of Exfoliation in Organoclay-based Nanocomposites", Polymer, vol. 42, 9513-9522 (2001).

Vaia et al., "Microstructural Evolution of Melt Intercalated Polymer—Organically Modified Layered Silicates Nanocomposites", Chem. Mater. vol. 8, 2628-2635 (1996).

\* cited by examiner (a)

(b)

US 7,989,534 B2

POLYMER-CLAY NANOCOMPOSITES AND METHODS OF MAKING THE SAME

CROSS REFERENCE TO RELATED APPLICATION

This application claims the benefit of U.S. Provisional Patent Application No. 60/830,757 filed Jul. 12, 2006, which is incorporated by reference herein in its entirety.

STATEMENT REGARDING FEDERALLY SPONSORED RESEARCH

The United States Government has certain rights to this disclosure pursuant to National Science Foundation Grant No. 0304803 and a National Aeronautics Space Administration Grant No. NGT5-40093.

FIELD OF THE INVENTION

The present disclosure generally relates to polymer-clay nanocomposites. More particularly, the present disclosure relates to polymer-clay nanocomposites in which the polymer is modified to promote melt intercalation and/or exfoliation.

BACKGROUND

Polymer-layered silicate nanocomposites (PLSNs) have generated significant interest in academia and industry since they possess a wide range of enhanced properties. The excellent properties of such PLSNs primarily result from the use of highly anisotropic nanoscale reinforcements having particle sizes as small as 1 to 1,000 nanometers (nm) as opposed to microscale reinforcements having particle sizes as small as 1 to 1,000 micrometers (µm). The reinforcements in PLSNs can be inorganic filler particles such as layered silicates. One example of a layered silicate that has been used in PLSNs is sodium-montmorillonite (Na-Mmt), which has a crystal lattice containing two-dimensional layers in which a central octahedral sheet of alumina or magnesia is fused with two external silica tetrahedra at the tip. The thickness of the sheet is around 1 nm. These layers organize into stacks with a regular Van der Waals gap called the "interlayer" that can have a spacing of about 0.96 nm. Isomorphous substitution of the $Al^{3+}$ by $Mg^{2+}$ or $Si^{4+}$ by $Al^{3+}$ within the layered silicate can generate a net negative charge on the layer, which can be counterbalanced by alkali or alkaline earth metal cations in the galleries, i.e., the boundary region between the layers. the interlamellar cations are hydrated with one or two shells of water that surround them. Thus, the chemical formula of montmorillonite is $[M_x (Al_{4-x}Mg_x) Si_8O_{20} (OH)_4]$, where "M" is a monovalent cation, which resides in the intergallery spaces and "x" is the degree of isomorphous substitution.

Various methods have been used to fabricate PLSNs, including in situ-polymerization, solution intercalation, and melt intercalation, which is considered to be the most versatile and environmentally benign method for commercially producing PLSNs. This method involves mixing a polymer and a silicate using relatively high shear forces and heating the mixture above the glass transition or melting temperature of the polymer. The silicates used in this method are usually organically modified at the surface to improve their interactions with hydrophobic polymers, which are mostly non-polar. Organic modification can be achieved by exchanging the interlamellar alkali/alkaline ions with long chain alkyl amines or quaternary ammonium ions.

BRIEF SUMMARY

Polymer-clay nanocomposites and methods of making the same are disclosed. Articles made of such nanocomposites are also disclosed. In an embodiment, a polymer-clay nanocomposite comprises a non-metal salt of an ionomer and a nanostructured layered clay.

In another embodiment, a method of making a polymer-clay nanocomposite comprises melt processing a mixture comprising a non-metal salt of an ionomer and a nanostructured layered clay.

The above described and other features are exemplified by the following detailed description.

BRIEF DESCRIPTION OF THE DRAWINGS

Referring now to the figures, which are exemplary embodiments and wherein like elements are numbered alike (nomenclature is described later in the Detailed Description).

DETAILED DESCRIPTION

Figure 1:
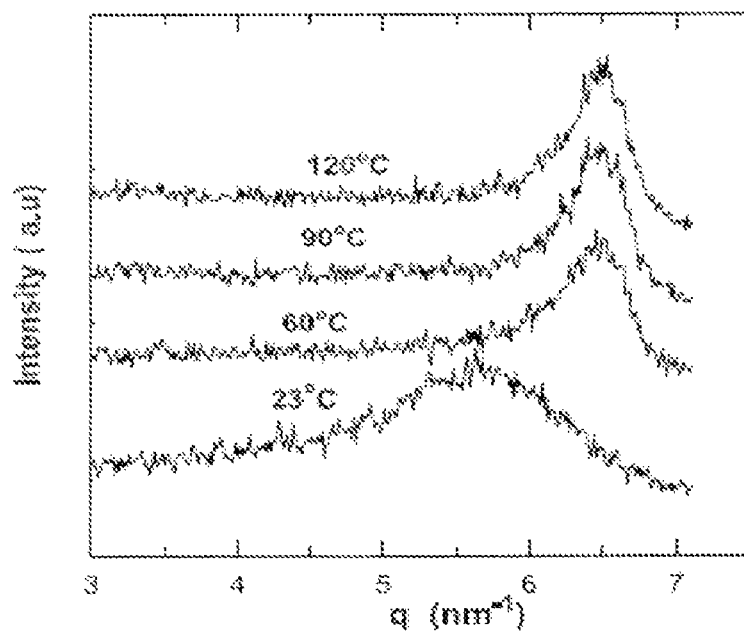
FIG. 1 depicts a graph illustrating the WAXD pattern of CLOISITE $Na^+$ as a function of temperature.

In accordance with an exemplary embodiment, polymer-clay composite compositions include a layered clay mixed with a modified polymer, in particular a non-metal salt of an ionomer. Ionomers are polymers containing non-ionic and ion-containing repeating units (usually less than 20 mole % of the latter). The introduction of specific non-metal ions along the polymer chain promotes the melt intercalation and/or exfoliation of the clay without the need to organically modify the clay. "Melt intercalation" refers to the incorporation of the polymer within the galleries of the clay, which are the boundary regions between the clay layers. "Exfoliation" refers to the breaking up of particle aggregates in the clay into individual platelets. The presence of the non-metal ions in the ionomer aids in the dispersion of the ionomer throughout the clay. In the absence of ionized units along the polymer chain, the charged nature of the surface of the clay in its natural, unmodified form would make it difficult to intercalate the non-polar or slightly polar polymer without surface modification of the clay. Although organic modifications of the clay can produce intercalated polymer-clay composites, the organic modifiers are particularly susceptible to degradation at the elevated temperatures used to melt process the composite, causing the silicate layers to regain their hydrophilicity. The instability of the organoclay could also adversely affect the stability of the polymer and suppress rather than promote intercalation of the polymer into the galleries. Therefore, the modification of the polymer avoids the drawbacks of modifying the clay.

The polymer-clay composite is desirably a nanocomposite in which one or both of the ionomer and the clay is nanostructured. As used herein, "nanostructured" refers to a material of which at least a portion of its particles has a size of about 1 to about 1,000 nm. It is understood that the nanostructured material can also contain particles larger than 1,000 nm, e.g., micrometer-sized particles ranging from a size of about 1 to about 100 μm.

In an embodiment, the repeat units of the non-metal salt of the ionomer are represented by one of the following formulas:

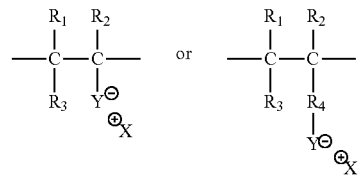

where each of the $R_1$, $R_2$, $R_3$ and $R_4$ is an organic or oligomeric ligand or is hydrogen, Y is a carboxylate, sulfonate, or phosphonate group, and $X^+$ for the ionomer include but are not limited to alkyl amine ions, quaternary ammonium ions, phosphonium ions, a sulfonic acid ion, a carboxylic acid ion, and combinations comprising at least one of the foregoing ions. The ionomer can be derived from various polymers, including but not limited to, polystyrene, polyketones, polyolefins, polyesters, polyamides, polymethacrylate, polysulfones, polyimides, polyethers, polysiloxanes, polyurethanes, co-polymers comprising at least one of the foregoing polymers, and combinations comprising at least one of the foregoing polymers. In one embodiment, the ionomer is a sulfonated polystyrene (SPS) having a sulfonate group concentration of about 0 to about 20 mole %.

In an embodiment, the layered clay is an unmodified clay, wherein "unmodified clay" herein refers to a clay that has not been organically modified. The unmodified clay can be a pristine silicate such as montmorillonite (e.g., Na-Mmt), saponite, hectorite, mica, vermiculite, bentonite, nontronite, beidellite, volknoskoite, magadite, kenyaite, other silicates, or a combination comprising at least one of the foregoing clays. The concentration of the layered clay can be about 0.1 weight % (wt %) to about 30 wt %, specifically about 0.5 wt % to about 10 wt %, and more specifically about 1 wt % to about 5 wt %, based on the total weight of the polymer-clay composite. Thus, the ionomer makes up a majority of the composite composition.

In accordance with another exemplary embodiment, the polymer-clay composite can include another polymer mixed with the non-metal salt of the ionomer and the layered clay material. The additional polymer can be non-polar such as polystyrene or slightly polar such as polyamides. Thus, the presence of the ionomer in the composite serves as a compatabilizer for intercalating the additional polymer into the unmodified clay. In the absence of the ionomer, the charged nature of the clay would probably cause the polymer to be immiscible in the clay. Examples of suitable polymers for inclusion with the ionomer include but are not limited to polystyrene, polycarbonates, polymethacrylate, polyamides, polyesters, polyvinyl chloride, polyvinylidene chloride, polyolefins, liquid crystalline polymers, polyethers, polyimides, polysulfones, polyketones, epoxies, polysiloxanes, polyurethanes, other organic polymers, and combinations comprising at least one of the foregoing polymers. The additional polymer can also be sulfonated, phosphonated, or carboxylated. The concentration of the additional polymer in the composite can be about 0.1 wt % to about 99.9 wt %, specifically about 50 wt % to about 99 wt %, and more specifically about 80 wt % to about 95 wt %, based on the total weight of the composite. Correspondingly, the ionomer concentration in the composite can be about 0.1 wt % to about 99 wt %, specifically about 0.5 wt % to about 20 wt %, and more specifically about 1 wt % to about 10 wt %. The clay concentration in the composite can be about 0.1 wt % to about 30 wt %, specifically about 0.5 wt % to about 10 wt %, and more specifically about 1 wt % to about 5 wt %.

Achieving intercalation of the layered clay depends on the ion exchange capacity to cation exchange capacity (IEC/CEC) of the composite and also the gallery spacing of the clay, i.e., the distance between galleries. In an embodiment, the IEC/CEC ratio can be about 0.5 to about 50, specifically about 0.8 to about 25, and more specifically about 1 to about 10. In addition, the gallery spacing can be increased by increasing the number of alkyl substituents on the non-metal salt used as the counter-ion in the ionomer. The gallery spacing can also be increased by increasing the length of the alkyl substituents on the non-metal salt. Thus, preferred non-metal salts are primary amine salts, secondary amine salts, tertiary amine salts, and quaternary ammonium salts, such as tetra-octyl ammonium or tetra-decyl ammonium, and combinations comprising at least one or the foregoing salts.

In an exemplary embodiment, the polymer-clay composite compositions described above can be formed by melt processing a mixture containing the non-metal salt of the ionomer, the layered clay, and optionally the additional polymer. Examples of suitable melt processing methods include but are not limited to extrusion, injection molding, compression molding, and intensive mixing. In one embodiment, a polymer-clay composite is formed by adding a portion (e.g., half) of the ionomer to an extruder, such as recirculating co-rotating twin screw extruder, heated to a temperature above the glass transition temperature of the ionomer and set at a relatively low screw speed. After the polymer in the extruder becomes molten, the layered clay can be added to the extruder, followed by adding the remainder of the polymer to the extruder. The screw speed can then be increased to mix the polymer and layered clay. During the mixing, the exit valve to the extruder can be closed and the recirculation valve can be opened to allow it to function as a batch mixer. After mixing the blend for the desired time, the resulting composite material can be pumped out through the exit valve. The screw speed and mixing time can vary to achieve a relatively uniform mixture. In alternative embodiments, the polymer and the clay can be pre-mixed before adding the blend to the extruder, or they can be separately added to the extruder one right after the other. Any of these embodiments can be altered by the addition of another polymer to the extruder after or during the mixing of the ionomer and the clay. In addition, the composites may be prepared using conventional, continuous flow, single screw and twin screw extruders, commercial melt batch mixers and injection molding machines.

The disclosure is further illustrated by the following non-limiting examples.

EXAMPLE 1

Materials and Synthesis for Study A

A commercial atactic polystyrene, STYRON® 666, with $M_w=280$ kilodaltons (kDa) and $M_n=106$ kDa was provided by Dow Chemical Company and used as received. Low molecular weight polystyrene with a molecular weight range of 0.8-5 kDa was obtained from Polysciences Inc. Sulfonated polystyrene ionomers (SPS) were prepared by sulfonating polystyrene (PS) in 1,2-dichloroethane solution using acetyl sulfate at 50° C. following a procedure described in U.S. Pat. No. 3,870,841 to Makowski et al. (assigned to Exxon Research and Engineering Company, US). The sulfonation reaction is an electrophilic substitution reaction, which substitutes sulfonic acid groups randomly along the chain, primarily at the para-position of the phenyl ring. The ionomers were isolated from solution by distillation of the solvent, filtered, washed several times with deionized distilled water, and dried under vacuum. The sulfonation level of the ionomer was determined by titration of the sulfonic acid derivative (HSPS) in a mixed solvent of toluene/methanol (volume ratio of 90/10) with methanolic sodium hydroxide of known normality to a phenolphthalein end-point. Ionomers with four different sulfonation levels were prepared: 1.3, 3.4, 4.2 and 8.3 mole percent (%) of the styrene rings sulfonated, which correspond to ion-exchange capacities (IEC) of 0.12, 0.32, 0.39 and 0.75 milliequivalent/gram (mequiv/g), respectively.

Reagent grade butyl amine (BuA), di-butyl amine (DBA), tributyl amine (TBA), octyl amine (OA), and hexadecyl amine (HDA), were obtained from Aldrich Chemical Company and used as received. The alkyl amine salts of SPS were prepared by dissolving the HSPS in toluene/methanol solutions and neutralizing with stoichiometric addition of the appropriate alkyl amines. The neutralized ionomers were isolated by steam distillation, filtered, washed several times with deionized distilled water, and dried under vacuum at 80° C. The sodium montmorillonite (Na-Mmt) used was CLOISITE $Na^+$, obtained from Southern Clay Products. The cation exchange capacity (CEC) cited by the manufacturer was 0.92 mequiv/g, and the clay was used as received without any further drying.

The sample nomenclature used for the ionomer herein is rst-SPSx.y, where rst denotes the alkylamine cation and x.y indicates the ion exchange capacity (IEC) of the ionomer in mequiv/g.

Quaternary sulfonated polystyrene (quaternary SPS) was also synthesized in a similar manner as the primary, secondary and tertiary amine neutralized SPS. Stoichiometric quantities of tetra-butylammonium and tetra-octylammonium were added to the reaction mixture of HSPS dissolved in toluene/methanol (volume ratio of 90/10), and the reaction was continued for 12 hours (b). The quaternary ammonium salts of SPS were isolated from the solution by steam-stripping, washed several times with deionized distilled water, and dried under vacuum for 24 h. The sample nomenclature used for the quaternary salts was teBu-SPSx.y and teOc-SPSx.y for the tetra-butyl SPS and tetra-octyl SPS, respectively.

EXAMPLE 2

Melt Processing for Study A

A DACA microcompounder (a vertical, recirculating co-rotating twin screw extruder) produced by DACA Instruments, located in California was used for melt-processing SPS/Na-Mmt and SPS/PS/Na-Mmt blends formed from the materials described in Example 1. The extrusion temperature in most of the cases was 50° C. above the glass transition temperature (Tg), the screw speed was 190 rotations/minute (rpm), and the mixing time was fixed at 10 minutes (min). In other experiments, the shear rate (i.e. screw speed) and melt temperature were varied. The polymers were added to the extruder using a lower screw speed, i.e., 70 rpm, than was used for the mixing. First, half of the polymer (about 2 g) was added, followed by addition of the Na-Mmt after the polymer became molten. Then the remainder of the polymer was added, and the screw speed was increased to 190 rpm. During the mixing, the exit valve was closed and the recirculation valve of the DACA was opened, so that the DACA functioned as a batch mixer. After 10 min of blending, the samples were pumped out through the exit valve. Any material left after that was removed from the screws and the barrel after stopping the extruder.

EXAMPLE 3

Materials Characterization for Study A

Samples for materials characterization were prepared by compression molding 1 millimeter (mm) thick films with a Wabash two platen press obtained from Wabash MPI of Wabash, Ind. using a rectangular mold and the same temperatures used to process the blends of Example 2. A preheating time of 3 min without pressure was followed by a compression molding time of 5 min at higher pressure (about 90 kiloNewtons). The samples were watercooled in the press at elevated pressure and removed from the press at room temperature. The blend nomenclature followed herein is rst-SPSx.y/Mmt for ionomer-silicate blends and (m/n)PS/rst-SPSx.y/Mmt for the PS/ionomer/Na-Mmt blends, where (m/n) denotes the PS/SPSx.y composition in terms of weight ratio based on the total polymer content. The composition of the silicate was fixed in all mixtures at 3 weight (wt) % based on the total weight of the mixture.

Wide angle X-ray diffraction (WAXD) of the compression molded specimens was done with a Bruker D8 Advance diffractometer using CuKα (wavelength ($\lambda$)=0.154 nanometers (nm)) radiation at a voltage and current of 40 kiloVolts (kV) and 40 milliAmpere (mA), respectively. The scattering angle (2θ) was scanned from 3° to 12° at a scan speed of 0.1°/min at room temperature. That angular range corresponded to values of the momentum transfer vector $q=4\pi \sin(\theta/\lambda)$ from 2.1 to 8.5 $nm^{-1}$. The basal spacings of the silicate layers (d) were calculated using Bragg's law, i.e., $d=2\pi/q$. Transmission electron microscopy (TEM) was carried out with a Philips 300 electron microscope obtained from Philips Electron Optics of Eindoven, Netherlands using an operating voltage of 80 kV. Thin sections (about 70 nm) were microtomed from compression molded samples at room temperature with a diamond knife using a LKB ultramicrotome obtained from LKB Instruments of Australia. The sections were collected from the water trough and floated directly onto Cu grids. No external staining was used; the contrast was provided by electron density differences between the silicate layers and the polymer matrix.

FIG. 1 shows the WAXD of pristine Na-Mmt as a function of temperature. The $d_{001}$ peak shifted to higher q values with increasing temperature, which corresponds to a decreasing intergallery spacing. At a temperature as low as 60° C., the d-spacing changed from 1.03 to 0.96 nm as a result of water loss, and that d-spacing remained constant until 150° C. The PLSNs were processed between 150 and 160° C., so it was assumed that the weakly bonded water was already lost, and the base gallery spacing for the clay was assumed to be 0.96 nm. The large full width at half maximum (fwhm) of the as-received clay represents a large inhomogeneity of the intergallery spacings, which is believed to be a result of the poorly crystalline nature and the turbostratic packing of smectite minerals.

Figure 2:
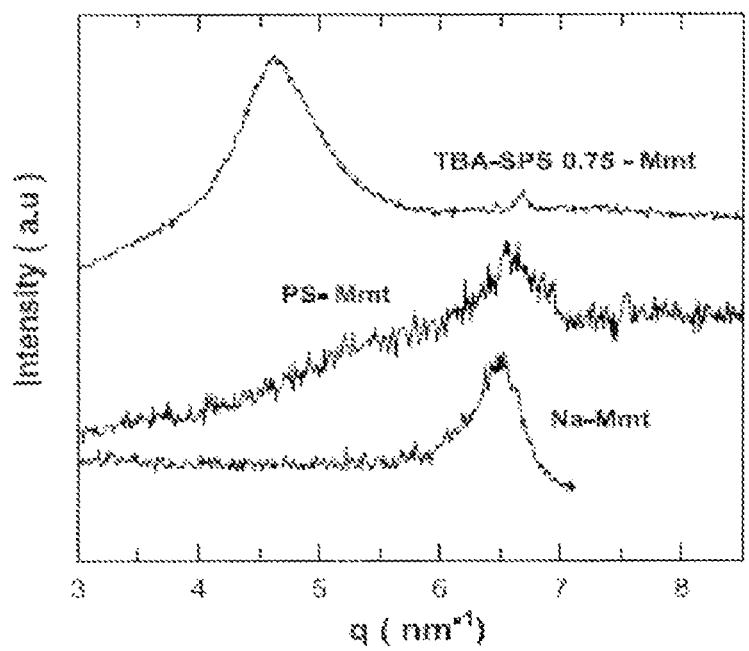
FIG. 2 depicts a graph illustrating the WAXD patterns of TBA-SPS0.75 and PS with 3 wt % Na-Mmt and of Na-Mmt at 150° C.

FIG. 2 compares the XRD of TBA-SPS0.75 and PS melt blended with 3 wt % silicate. The XRD of the PS/silicate sample shows a peak at the same position as for the neat silicate that corresponds to a gallery spacing of 0.96 nm. The peak moved to lower q (d=1.37 nm) for the ionomer/silicate nanocomposite, which indicates improved intercalation of the polymer within the gallery.

EXAMPLE 4

Effects of IEC/CEC Ratio for Study A

Figure 3:
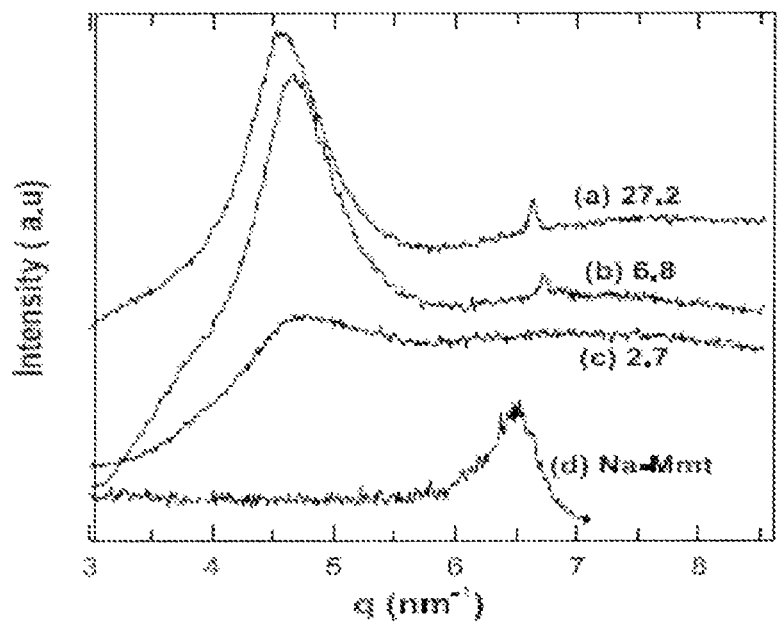
FIG. 3 depicts a graph illustrating the WAXD patterns for the following composites containing 3 wt % Mmt and having varying IEC/CEC ratios: (a) (100/0)PS/TBA-SPS0.75/Mmt, (b) (75/25)PS/TBA-SPS0.75/Mmt, (c) (90/10)PS/TBA-SPS0.75/Mmt, and (d) Na-Mmt at 150° C.

The IEC of the polymer in the composite was varied by either changing the sulfonation level of the ionomer and/or the amount of ionomer used in a PS/SPS blend, i.e. by diluting the ionomer with PS. FIG. 3 shows XRD results for three different values of IEC/CEC: 2.7, 6.8 and 27.2, that were achieved by mixing different ratios of PS with the TBA-SPS0.75. The neat ionomer had an IEC of 0.75 mequiv/g, and the clay had a CEC of 0.92 mequiv/g. For each mixture containing the ionomer, the XRD peak moved from the intergallery spacing of the silicate at 0.96 nm to higher spacing, which indicates that the ionomer not only promoted intercalation, but it also appears to function effectively as a compatabilizing agent for the hydrophobic PS with the clay. For IEC/CEC ratios of 27.2 and 6.8, the gallery spacing increased to 1.37 nm, while for the lowest IEC/CEC ratio of 2.7, the gallery spacing increased to 1.31 nm. A small peak corresponding to 0.96 nm was also seen at higher angles for the IEC/CEC ratios of 27.2 and 6.8, indicating the presence of a small amount of unintercalated Na-Mmt.

Figure 4:
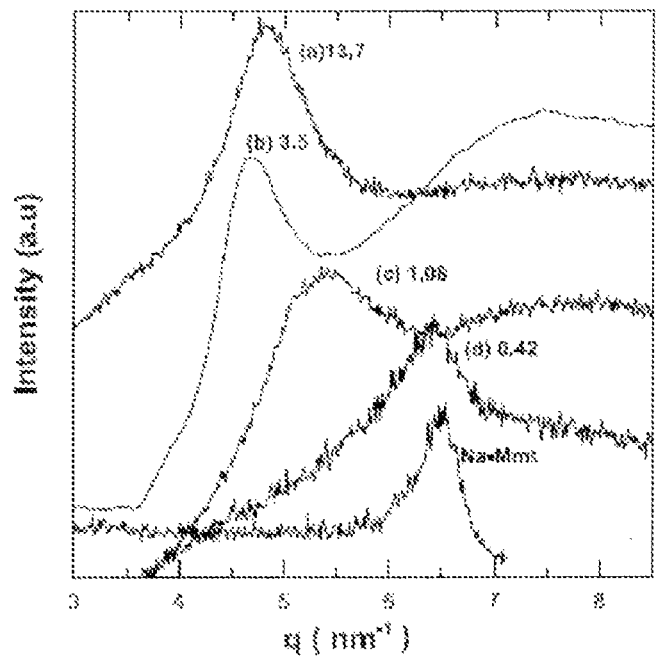
FIG. 4 depicts a graph illustrating the WAXD patterns for the following composites containing 3 wt % Mmt and having varying IEC/CEC ratios: (a) (100/0)PS/TBA-SPS0.39/Mmt, (b) (75/25)PS/TBA-SPS0.39/Mmt, (c) (75/25)PS/TBA-SPS0.12/Mmt, (d) (90/10)PS/TBA-SPS0.12/Mmt, and (e) Na-Mmt at 150° C.
Figure 5:
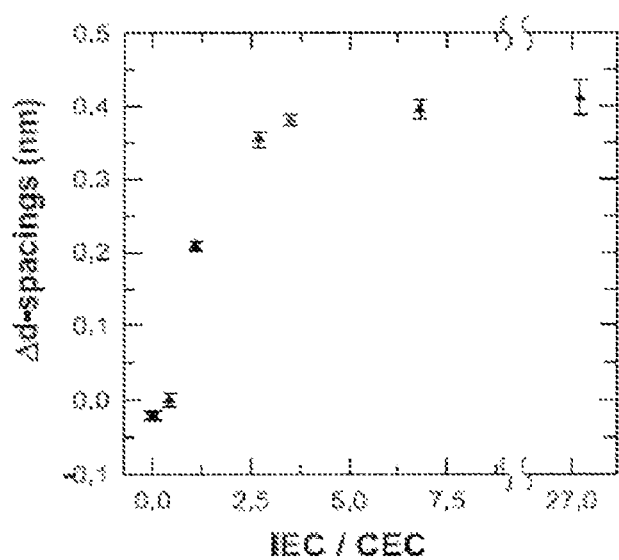
FIG. 5 depicts a graph plotting the change in gallery spacing ($d_{(001)}$) spacing as a function of the IEC/CEC ratio, where "•" indicates composites with PS and "Δ" indicates composites with TBA-SPSx.y ionomers.

FIG. 4 shows the XRD data as a function of the IEC/CEC ratio for mixtures of PS with the ionomers with lower IEC: TBA-SPS0.39 and TBA-SPS0.12. For the lowest IEC/CEC ratio of 0.42, the gallery spacing showed no change compared with that of Na-Mmt. For the IEC/CEC ratio of 1.08, as illustrated by curve (c) in FIG. 4, the gallery spacing increased compared to that in Na-Mmt, but the increase to 1.15 nm was much less than for the blends with an IEC/CEC ratio of 3.5. The latter result was consistent with the changes that were observed for IEC/CEC ratios >2.7 shown in FIG. 3 for the blends that used the higher IEC ionomer. FIG. 5 summarizes the change in the gallery spacing as a function of the IEC/CEC ratio for all of the blends studied using TBA-SPSx.y. It appears from these data that an IEC/CEC ratio of >1 is necessary to achieve intercalation and a IEC/CEC ratio of about 2.5 is needed to reach an upper limit on the increase in the gallery spacing.

Figure 6:
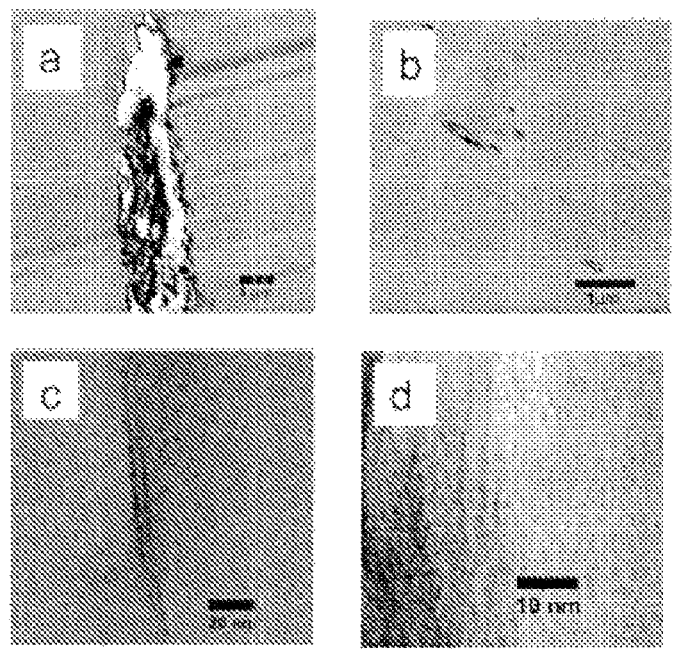
FIG. 6 depicts TEM photomicrographs at low magnification of PS/Na-Mmt and (75/25)PS/TBA-SPS0.75Mmt (a and b, respectively) and at high magnifications of (75/25)PS/TBASPS0.75/Mmt, (c and d)

The TEM micrographs in FIGS. 6(a) and (b) show the dispersion of the clay in the absence and presence of ionomer. FIG. 6(a) clearly shows the immisicible morphology of a PS, Na-Mmt mixture. The particle size of the clay tactoids was greatly reduced when the TBASPS0.75 was added to the PS, as seen in FIG. 6(b). Higher magnification of the (75/25) PSTBASPS0.75/Na-Mmt composite, as shown in FIGS. 6(c) and (d), shows that the interlayer spacing of the intercalated clay increased to 1.3-1.4 nm, which agrees with the XRD data. The TEM images, however, showed a mixed morphology, with some layers intercalated and some not. The increase in spacing was observed at the edges of most of the larger particles and large numbers of 2-3 platelets stacked were observed. Thus, addition of the ionomer produced a more delaminated and dispersed nanocomposite. No exfoliation was seen in any of the samples studied.

EXAMPLE 5

Effect of Processing Conditions on Nanocomposite Morphology for Study A

Figure 7:
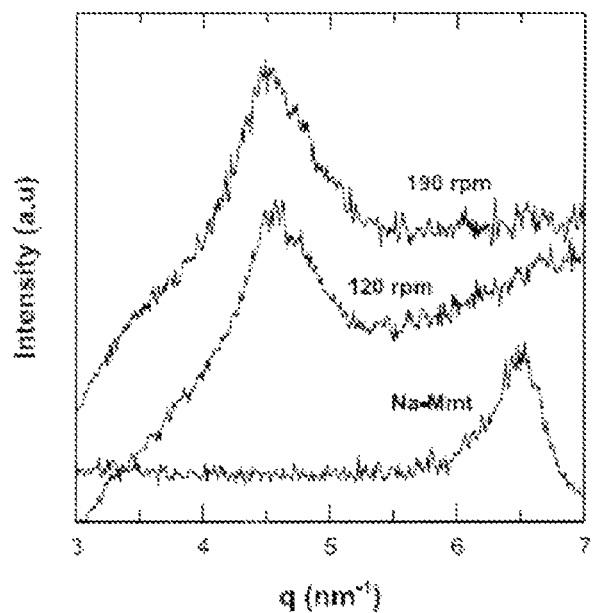
FIG. 7 depicts a graph illustrating WAXD patterns of TBA-SPS0.75/Mmt composites with 3 wt % Mmt as a function of shear rate used in compounding: XRD of Na-Mmt at 150° C. is shown for reference.

The intercalation behavior of the amine-neutralized SPS was also investigated as a function of the shear rate, mixing time, and mixing temperature used. Though intermeshing extruders usually provide more shear intensive mixing than the non-intermeshing twin-screw extruders, a non-intermeshing co-rotating twin-screw extruder was used based on the findings that such a screw configuration produced the best dispersions for nylon 6 nanocomposites. See Dennis et al., *Polymer* 2001, 42(23): 0513-22. The effect of the screw speed, which is related to the shear rate, on the XRD of 3 wt % silicate composites with TBASPS0.75 is shown in FIG. 7. Since the shear stress also increased with shear rate, increasing the screw speed was expected to improve the extent of intercalation. However, the XRD data in FIG. 7 show no distinguishable differences in the intergallery spacing with increasing screw speed for the system under consideration. Therefore, it appears that the melt intercalation of PS/TBASPS with Na-Mmt was not influenced by the magnitude of the shear rate for the screw speed range used in this study, and for the other processing studies, the screw speed was fixed at 190 rpm.

Figure 8:
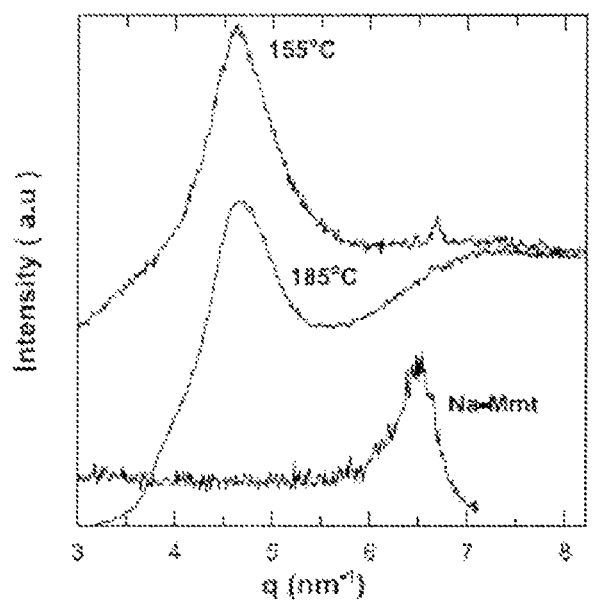
FIG. 8 depicts a graph illustrating WAXD patterns of (75/25)PS/TBA-SPS0.75/Mmt composites with 3 wt % Mmt prepared at different processing temperatures; XRD of Na-Mmt at 150° C. is shown for reference.

FIG. 8 shows the effect of the mixing temperature on the XRD (75/25) PS/TBASPS0.75/Mmt composites. The two temperatures used, 155 and 185° C. corresponded to 50 and 80° C. above Tg, respectively. Increasing the temperature of mixing had no effect on the intergallery spacing. Similarly, no differences were observed by varying the mixing time from 5 to 10 min (data not shown). As a result of the insensitivity of the intercalation to temperature, the mixing of these composites was, for the most part, carried out at T=Tg+50° C., which was conducive for higher shear stresses. Melt-mixing below that temperature was not possible because of torque limits of the extruder.

For a limited number of samples, melt mixing was also accomplished using a Brabender Plasticorder intensive mixer obtained from C. W. Brabender Instruments of South Hackensack, N.J. That instrument requires a larger feed, ca. 30 g of polymer. Like the DACA, it also possesses a nonintermeshing screw configuration, but in this case, it is counter-rotating. The screw speed for the Brabender was maintained at 90 rpm, and the torque was monitored during the entire duration of mixing. A steady torque was achieved after about 2-3 min of mixing. The changes in the intergallery spacings of Na-Mmt obtained from similar samples mixed in the two different mixers were almost identical.

Figure 9:
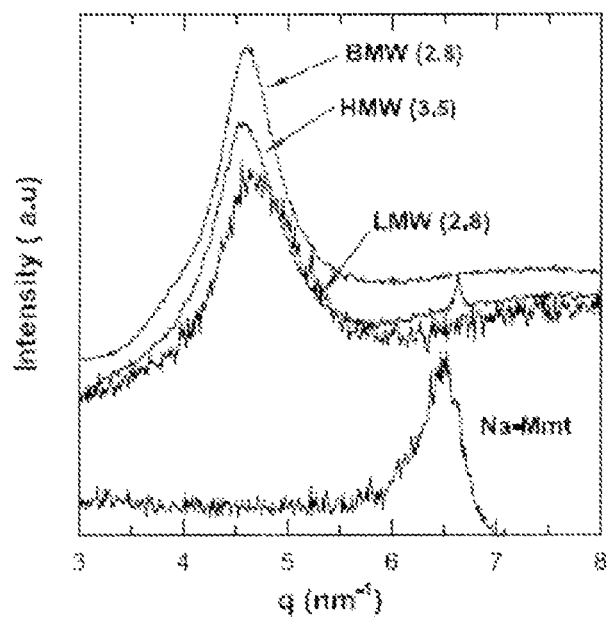
FIG. 9 depicts a graph illustrating WAXD patterns as a function of molecular weight of the ionomer for composites containing a PS/ionomer weight ratio of 75/25 and 3 wt % Mmt.

FIG. 9 compares the effect of molecular weight of the ionomer used for two different TBA-SPSx.y with similar sulfonation levels (x.y=0.75 and 0.66) on the level of intercalation. The high molecular weight (HMW) polymer (Mw=280 kDa) was used in a blend of (75/25)PS/TBASPS0.75/Mmt, and the low molecular weight (LMW) polymer (Mw=0.8-5 kDa) was used in a blend of (75/25) PS/TBA-SPS0.66/Mmt. The bimodal distribution molecular weight (BMW) blend consisted of 25 wt % of the TBA-SPS0.66 ionomer of low molecular weight (0.8-5 kDa) and 75 wt % of the PS of high molecular weight (280 kDa). The HMW polymer had a much higher melt viscosity, which translates into higher shear stresses that can aid dispersion. While the LMW polymer was expected to have a higher diffusion coefficient to aid transfer into the silicate galleries, the XRDs shown in FIG. 9 indicate no effect of the molecular weight of the ionomer on the gallery spacing of the melt mixed composites. The use of a BMW blend had no effect on the intercalation, as shown in FIG. 9. In that case, the HMW PS was chosen to increase the shear stresses and the LMW ionomer to optimize diffusion to the silicate galleries and to allow the use of lower processing temperatures than would be possible with the much higher viscosity high molecular weight ionomer. The IEC/CEC ratio was 2.9.

The results for the intercalation of the molten ionomer into the Na-Mmt were relatively insensitive to the processing variables. Further, the magnitude of the increase in d-spacings of the silicate indicates that the degree of penetration of the ionomer into the galleries was not substantial, and the increase in the gallery spacings might actually be due to the intercalation of smaller molecules than the polymer. Without intending to be limited by theory, it is believed that the counter-ion from the ionomer possibly exchanged with the Na-ions initially present in the galleries such that the net result of the melt intercalation process was to produce an organically modified clay by a meltphase reaction.

EXAMPLE 6

Effects of the Amine Counter-Ion for Study A

The effect of the alkyl amine counter-ion on the ability to intercalate the SPS ionomers into Na-Mmt was assessed by studying a series of amine neutralized polystyrene ionomers with varying number of alkyl substituents and alkyl chain lengths. Previous work showed that the nature of the alkyl amine counter-ion can greatly affect the rheological properties of the ionomer by providing differences in the strength of ion association and/or steric hindrance of the ionic groups. See Weiss et al. *Journal of Applied Polymer Science,* 29(9) 1994: 2719-34.

Figure 10:
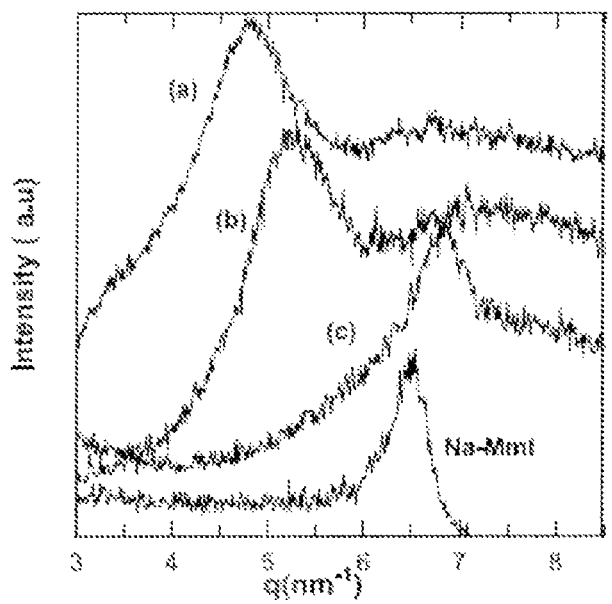
FIG. 10 depicts a graph illustrating WAXD patterns of the following alkylamine-neutralized SPS/Mmt composites as a function of the alkyl chain length: (a) (75/25)PS/OASPS0.75/Mmt (b) (75/25)PS/BuASPS0.75/Mmt, and (c) (75/25)PS/HDASPS0.75/Mmt, wherein all blends contained 3 wt % Mmt and 97 wt % polymer.

A series of mono-substituted n-alkyl amine salts with increasing alkyl chain length: butylamine (BuA-SPS), octylamine (OA-SPS), and hexadecylamine (HDA-SPS), were prepared from SPS0.75. These were melt mixed with PS to form 75/25 weight ratio blends with the ionomer and 3 wt % silicate composites in the DACA microcompounder using a screw speed of 190 rpm and a temperature of 50° C. above Tg. The XRD data of the composites are shown in FIG. 10. The d-spacings of the galleries increased as the alkyl chain length increased from butyl to octyl, but it decreased for the hexadecylamine salt. The increased d-spacing values for OA-SPS0.75 compared to BuA-SPS0.75 suggest that it was the amine, and not the polymer, that was intercalating into the clay. It is believed that the increase in the gallery spacing for the HDA-SPS may be due to the longer alkyl chain, which shields the N atom from interacting with the negative silicate layers.

Figure 11:
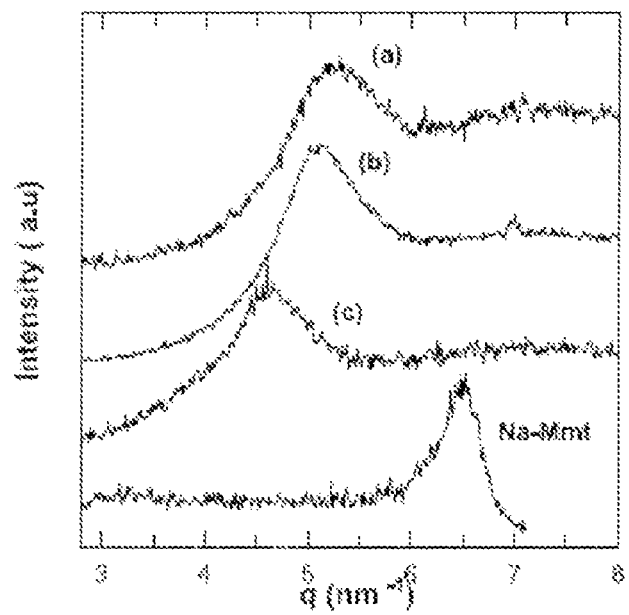
FIG. 11 depicts a graph illustrating WAXD patterns of the following alkylamine-neutralized SPS/Mmt composites as a function of the number of alkyl substituents on the amine: (a) (75/25)PS/BuASPS0.75/Mmt, (b) (75/25)PS/DBASPS0.75/Mmt, and (c) (75/25)PS/TBASPS0.75/Mmt, wherein all blends contained 3 wt % Mmt and 97 wt % polymer.

The effect of increasing the number of substituents on the N of the counter-ion was studied using butylamine (BuA-SPS0.75), dibutylamine (DBA-SPS0.75) and tributylamine (TBA-SPS0.75) ionomers in composites with PS and 3 wt % Na-Mmt. FIG. 11 shows XRD data of those melt-mixed and compression molded samples. The gallery spacing increased as the number of alkyl substituents increased, i.e., as the salt progressed from primary amine to secondary amine to tertiary amine. This, again, is consistent with an ion-exchange of the alkylamine salt for the $Na^+$ in the galleries; the larger, more bulky TBA produced the greatest separation of the gallery spacing.

EXAMPLE 7

Quaternary Ammonium Salts for Study A

Figure 12:
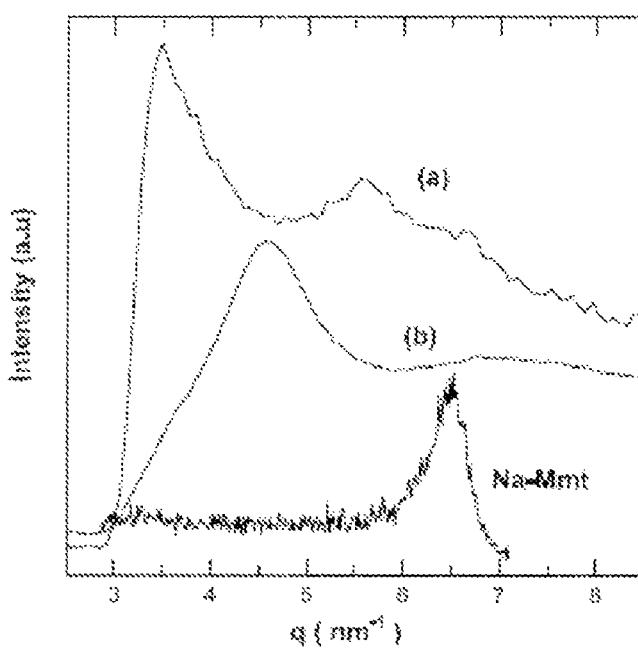
FIG. 12 depicts a graph illustrating WAXD patterns of the following quaternary ammonium salts of SPS/Mmt composites as a function of the alkyl chain length: (a) (75/25)PS/teOcSPS0.75/Mmt and (b) (75/25)PS/teBuSPS0.75/Mmt, wherein all blends contained 3 wt % Mmt and 97 wt % polymer.
Figure 13:
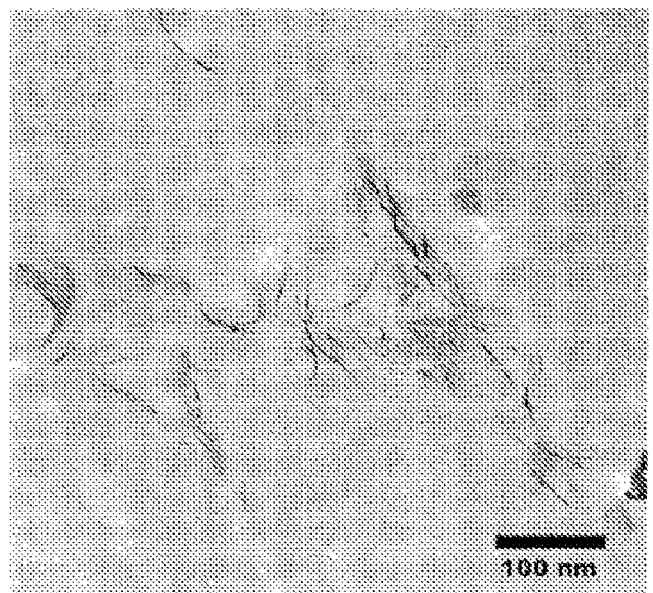
FIG. 13 depicts TEM photomicrographs of (75/25)PS/teOc-SPS0.75/Mmt at low magnification (a) and at higher magnification (b)
Figure 13:
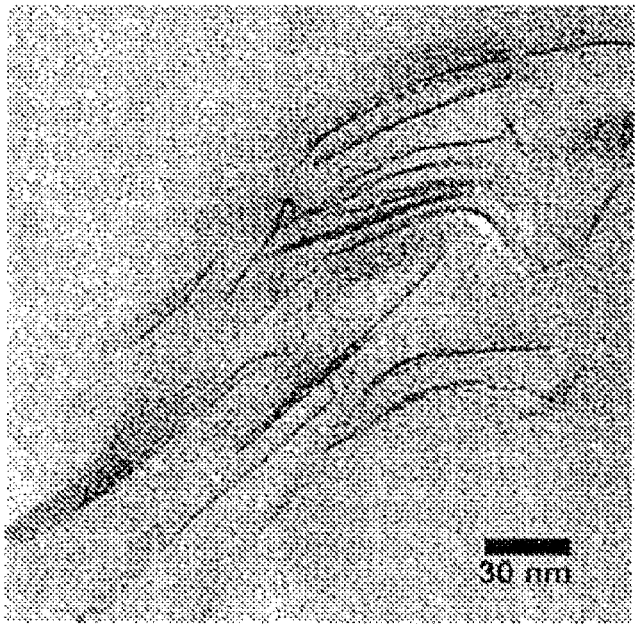

FIG. 12 shows the XRD of mixtures of Na-Mmt with a polymer blend of 25 wt % of TeBu-SPS or teOc-SPS and 75 wt % PS. For the blend with teBu-SPS0.75, the first order silicate reflection was at the same position as was obtained when tributyl amine was the counter-ion. However, for teOc-SPS0.75, there was a substantial increase in the gallery spacing; the $d_{(001)}$ reflection shifted from 0.96 nm for Na-Mmt to 1.96 nm for the composite. The TEM micrographs in FIG. 13 confirm that when teOc-SPS0.75 was used, the silicate gallery spacing increased and the dispersion of the silicate layers improved. The lower magnification images in FIG. 13(a) also show a partially exfoliated morphology consisting primarily of individually dispersed clay platelets and/or silicate layers arranged in small groups. The higher magnification images in FIG. 13(b) show a large number of objects having 2-3 layers of silicate stacked together. These micrographs are in contrast with the large clay micrometer size tactoids observed when the Na-Mmt was dispersed only in PS, cf. FIG. 6(a).

Based on the foregoing examples for study A, the melt mixing of pristine Na-Mmt with alkyl amine and quaternized ammonium salts of lightly sulfonated polystyrene ionomers resulted in an increase in the silicate gallery spacing consistent with intercalation. Mixtures of the ionomer with polystyrene exhibited similar gallery spacing increases, indicating that the ionomer is an effective compatibilizing agent for mixing of hydrophobic polymers into the clay. The extent of intercalation was independent on the melt processing conditions employed in this study and also did not change as the molecular weight of ionomer was varied. Intercalation appeared to be dependent on the charge ratio between the ionomer and the clay; when the ratio was greater than 1.0, interaction occurred. The increase in gallery spacing achieved was a function of size of the alkylamine counter-ions used. The more bulky, tri-substituted amine salts exhibited the largest gallery spacing increase. The extent of intercalation was consistent with an ion-exchange of the alkylamine counter-ions with the originally present NaC ions in the gallery, rather than intercalation of polymer, though no direct proof of that was obtained. More intercalation and even some exfoliation were achieved when a tetra-octyl ammonium salt was used.

EXAMPLE 8

Materials and Synthesis for Study B

A commercial atactic polystyrene, STYRON® 666, with $M_w$=280 kilodaltons (kDa) and $M_n$=106 kDa was provided by Dow Chemical Company and used as received. Low molecular weight polystyrene with a molecular weight range of 0.8-5 kDa was obtained from Polysciences Inc. SPS ionomers were prepared by sulfonating PS in 1,2-dichloroethane solution using acetyl sulfate at 50° C. following a procedure described in U.S. Pat. No. 3,870,841 to Makowski et al. (assigned to Exxon Research and Engineering Company, US). The sulfonation reaction is an electrophilic substitution reaction, which substitutes sulfonic acid groups randomly along the chain, primarily at the para-position of the phenyl ring. The ionomers were isolated from solution by distillation of the solvent, filtered, washed several times with deionized distilled water, and dried under vacuum. The sulfonation level of the ionomer was determined by titration of the HSPS in a mixed solvent of toluene/methanol (volume ratio of 90/10) with methanolic sodium hydroxide of known normality to a phenolphthalein end-point. Ionomers with three different counter-ions of varying alkyl chain length were prepared. Ionomers with a mole % sulfonation of 8 to 9 were targeted in this study. The actual mole % sulfonation was 8.3.

Reagent grade tetra-butyl ammonium hydroxide (Te-BuA), tetra-octyl ammonium bromide (Te-OcA), and tetra-decyl ammonium bromide (Te-DeA) were obtained from Aldrich Chemical Company and used as received. The alkyl amine salts of SPS were prepared by dissolving the HSPS in toluene/methanol solutions and neutralizing with stoichiometric addition of the appropriate alkyl amines. The reaction was allowed to progress for 12 h. The neutralized ionomers were isolated by steam distillation, filtered, washed several times with deionized distilled water, and dried under vacuum at 80° C. The Na-Mmt used was CLOISITE Na$^+$, obtained from Southern Clay Products. The CEC cited by the manufacturer was 0.92 mequiv/g, and the clay was used as received without any further drying.

The sample nomenclature used for the ionomer herein is rst-SPSx, where rst denotes the alkyl ammonium cation and x indicates the IEC of the ionomer in mequiv/g. The sample nomenclature used for the quaternary salts was TeBu-SPSx, TeOc-SPSx, and TeDe-SPSx for the tetra-butyl ammonium SPS, tetra-octyl ammonium SPS and tetra-decyl ammonium SPS, respectively.

EXAMPLE 9

Melt Processing for Study B

A DACA microcompounder (a vertical, recirculating co-rotating twin screw extruder) produced by DACA instruments, located in California was used for melt-processing SPS/Na-Mmt and SPS/PS/Na-Mmt blends formed from the materials described in Example 8. The extrusion temperature in most of the cases was 50° C. above Tg, the screw speed was 190 rpm, and the mixing time was fixed at 10 min. In other experiments, the shear rate (i.e. screw speed) and melt temperature were varied. The polymers were added to the extruder using a lower screw speed, i.e., 70 rpm, than was used for the mixing. First, half of the polymer (about 2 g) was added, followed by addition of the Na-Mmt after the polymer became molten. Then the remainder of the polymer was added, and the screw speed was increased to 150 rpm. During the mixing, the exit valve was closed and the recirculation valve of the DACA was opened, so that the DACA functioned as a batch mixer. After 10 min of blending, the samples were pumped out through the exit valve. Any material left after that was removed from the screws and the barrel after stopping the extruder.

EXAMPLE 10

Materials Characterization for Study B

Samples for materials characterization were prepared by compression molding 1 mm thick films with a Wabash two platen press obtained from Wabash MPI of Wabash, Ind. using a rectangular mold and the same temperatures used to process the blends of Example 9. A preheating time of 3 min without pressure was followed by a compression molding time of 5 min at higher pressure (about 90 kiloNewtons). The samples were watercooled in the press at elevated pressure and removed from the press at room temperature. The blend nomenclature followed herein is (m/n)PS/rst-SPSx/Mmt for the PS/ionomer/Na-Mmt blends, were (m/n) denotes the PS/SPSx composition in terms of weight ratio based on the total polymer content. The composition of the silicate was fixed in all mixtures at 3 wt % of the total polymer mix, except for one sample that had 10 wt % silicate. The composite samples studied are summarized in Table 1 below.

TABLE 1

Nomenclature and details of blend compositions

| Material | Counter-ion | IEC (mequiv/g) | Silicate in blend (wt %) | PS in polymer content (wt %) | Blend nomenclature |
|---|---|---|---|---|---|
| PS | — | 0 | 3 | 100 | (100/0)PS/Mmt |
| TeBu-SPS0.75 | Tetrabutyl ammonium | 0.75 | 3 | 75 | (75/25)PS/TeBu-SPS0.75/Mmt |
| TeOc-SPS0.75 | Tetrabutyl ammonium | 0.75 | 3 | 75 | (75/25)PS/TeOc-SPS0.75/Mmt |
| TeOc-SPS0.75 | Tetrabutyl ammonium | 0.75 | 3 | 90 | (90/10)PS/TeOc-SPS0.75/Mmt |
| TeOc-SPS0.75 | Tetrabutyl ammonium | 0.75 | 10 | 75 | (75/25)PS/TeOc-SPS0.75/Mmt |
| TeDe-SPS0.75 | Tetrabutyl ammonium | 0.75 | 3 | 75 | (75/25)PS/TeDe-SPS0.75/Mmt |

Wide angle X-ray diffraction of the compression molded specimens was done with a Bruker D8 Advance diffractometer using CuKα ($\lambda$=0.154 nm) radiation at a voltage and current of 40 kV and 40 mA, respectively. The scattering angle (2θ) was scanned from 3° to 12° at a scan speed of 0.1°/min at room temperature. That angular range corresponded to values of the momentum transfer vector $q = 4\pi \sin(\theta/\lambda)$ from 2.1 to 8.5 nm$^{-1}$. The basal spacings of the silicate layers (d) were calculated using Bragg's law: $d = 2\pi/q$.

Transmission electron microscopy was carried out with a Philips 300 electron microscope obtained from Philips Electron Optics of Eindoven, Netherlands using an operating voltage of 80 kV. Thin sections (about 70 nm) were microtomed from compression molded samples at room temperature with a diamond knife using a LKB ultramicrotome obtained from LKB Instruments of Australia. The sections were collected from a water trough and floated directly onto Cu grids. The silicate layers are comprised of heavier elements, such as Si and Al, than the interlayer and surrounding matrix, which is comprised of C, H, N, and O. As such, there was sufficient contrast between the clay (darker objects in the TEM images) and the polymer, so no external staining was needed. Although natural contrast was adequate to resolve the clay from the polymer, the contrast was not sharp enough at all magnifications to utilize automated image analysis software to resolve single platelets from stacks of 2-3 platelets. As a result, the number of platelets per particle was counted manually. TEM specimens were viewed under a magnification range of 40K-120K so as to include a large number of platelets or agglomerates, which provided good statistics of the distribution of particle sizes. For each sample, 15-20 micrographs were analyzed to determine the total number of platelets and the average number of platelets per stack. The platelets were categorized as single platelets, stacks of 2-5 platelets, and stacks comprising more than 10 platelets. The percent exfoliation was defined as the percentage of single platelets in the population.

The Tg and change in the specific heat ($\Delta C_p$) at the glass transition were measured with a MDSC™ TA2920 temperature-modulated differential scanning calorimeter (TMDSC), obtained from TA Instruments, using a heating rate of 2.5° C./min, a 60 second (s) period heating/cooling cycle of modulation and an oscillation amplitude of ±1° C. Dynamic mechanical properties of the composites were measured with a TA Instruments DMA model 2980 using the tensile mode and a frequency of 1 Hertz (Hz). The mechanical properties were obtained on compression molded samples. The temperature range used was −60 to 130° C., the amplitude of vibration was 10 µm, and the heating rate was 2° C./min.

Figure 14:
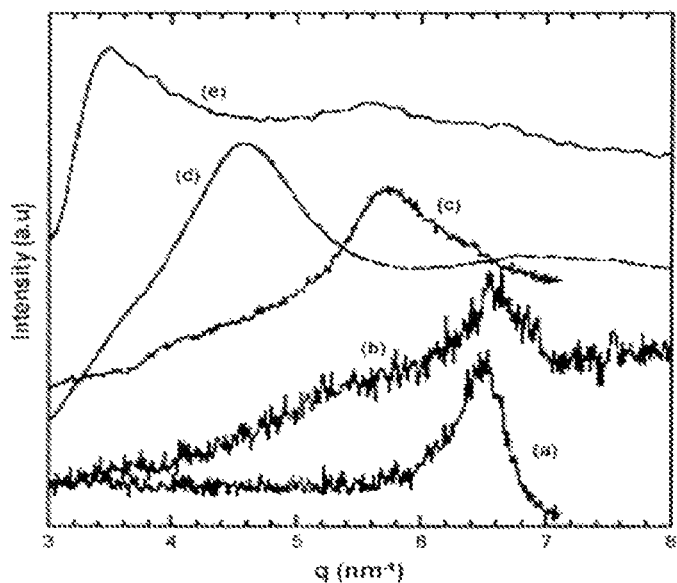
FIG. 14 depicts a graph illustrating WAXD patterns of the following PS/SPS/Mmt composites as a function of the alkyl chain length of the quaternary ammonium counter-ions in sulfonated PS ionomers: (a) Na-Mmt at 150° C., (b) (100/0)PS/SPS/Mmt, (c) (75/25)PS/TeDe-SPS0.75/Mmt, (d) (75/25)PS/TeBu-SPS/0.75/Mmt, and (e) (90/10)PS/TeOc-SPS0.75/Mmt.

FIG. 14 shows the WAXD data (2θ=3-10°) for PS/SPS/Na-Mmt composites as a function of alkyl chain length of the quaternary ammonium counter-ions in ammonium-neutralized SPS; each composite contained 3 wt % silicate. The diffraction patterns are offset vertically for clarity. The 150° C. XRD pattern of Na-Mmt shows that the base gallery spacing for the clay was 0.96 nm. The original $d_{(001)}$ spacing of Na-Mmt at room temperature is 1.03 nm; the difference is because of collapsing of the layers due to loss of water at high temperatures. The PLSNs were processed at 150 to 160° C., so it was assumed that the weakly bonded water in Na-Mmt was already lost from the clay.

The WAXD of the PS/silicate sample shows a peak at the same position as for the neat silicate that corresponds to a gallery spacing of 0.96 nm. The peaked moved to lower q for the PS/ionomer/silicate nanocomposites, which indicates higher spacings for the Na-Mmt galleries. The WAXD peak for the (75/25)PS/TeBu-SPS0.75/Mmt composite corresponded to a d-spacing of 1.37 nm, and the $d_{(001)}$ reflection of the (90/10)PS/TeOc-SPS0.75/Mmt composite, which exhibited the maximum intercalation, shifted from 0.96 nm for Na-Mmt to 1.96 nm for the composite. Higher order reflections were not observed for any of these nanocomposites. The peak at q~5.5 nm$^{-1}$ seen in curve (e) is a result of partial intercalation in some silicate layers, while the peak at q~6.8 nm$^{-1}$ is presumably due to completely unintercalated layers. The peak position in curve (b) is similar to that of Na-Mmt (curve a) by itself. The large full width half maxima of the peaks indicate large inhomogeneities of intergallery spacings, though the positions of WAXD peaks were reproducible for different batches of nanocomposites with the same composition. For comparison, the changes in the d-spacings of Na-Mmt, when an equivalent amount of low molecular weight quaternary ammonium salt such as Te-OcA was added in the extruder during melt mixing of PS and Na-Mmt, was evaluated. In that case, the $d_{(001)}$ spacing changed from 0.96 to 1.09 nm compared with the 1.96 nm spacing observed when the TeOc-SPS ionomer was used.

Figure 15:
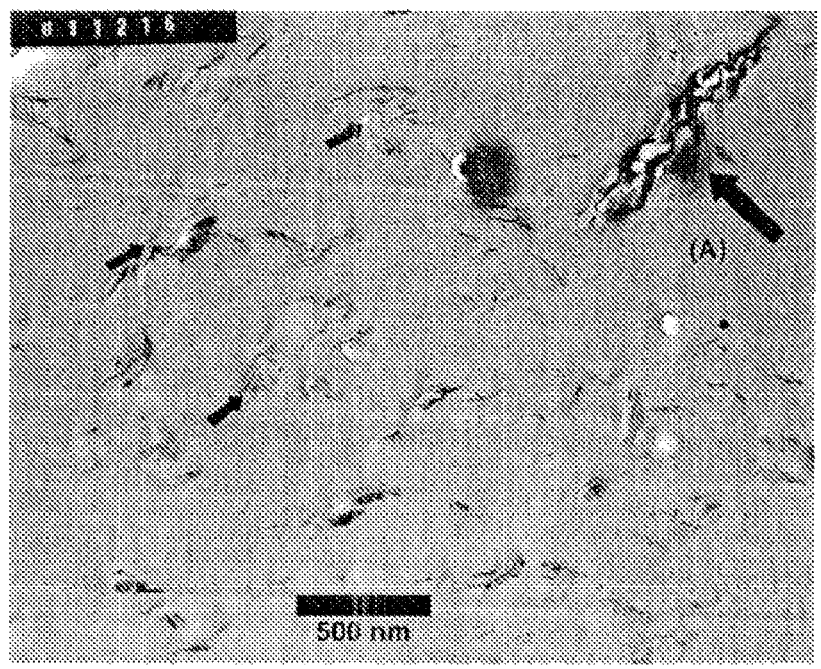
FIG. 15 depicts a TEM bright field image of (75/25)PS/TeOc-SPS0.75/Mmt containing 3 wt % silicate.

A typical TEM bright field image of a PS/TeOC-SPS0.75/Mmt (75/25 weight ratio) nanocomposite at a relatively low magnification is shown in FIG. 15. Single clay layers that provide evidence of exfoliation were present in abundance throughout the polymer matrix. However, intercalated and disordered layers also co-existed with the exfoliated silicate. There was no significant orientation of these platelets, as expected for a compression molded sample. The intercalated tactoids such as (A) were responsible for the peak seen in the WAXD patterns while the disordered and exfoliated structures probably had little or no contribution to the WAXD pattern over the angular range shown in FIG. 14. Some regions in the micrograph shown in FIG. 15, such as the feature marked (A) contained as many as 10-20 silicate layers stacked together. However, the majority of the clay layers were present as single layers or as stacks of 2-5 layers (marked by the small arrows). The exfoliated layers had different lengths, with an average length of 80 to 140 nm. This disparity in platelet lengths can be due to a variety of reasons. First, clay platelets at the source of origin exhibit a wide distribution of lateral dimensions. During extrusion of the polymer-clay composites, the shear forces acting on the platelets could have caused them to break, affecting the distribution of sizes and shapes. In addition, the microtoming procedure could have increased the heterogeneity in platelet length and thickness.

Figure 16:
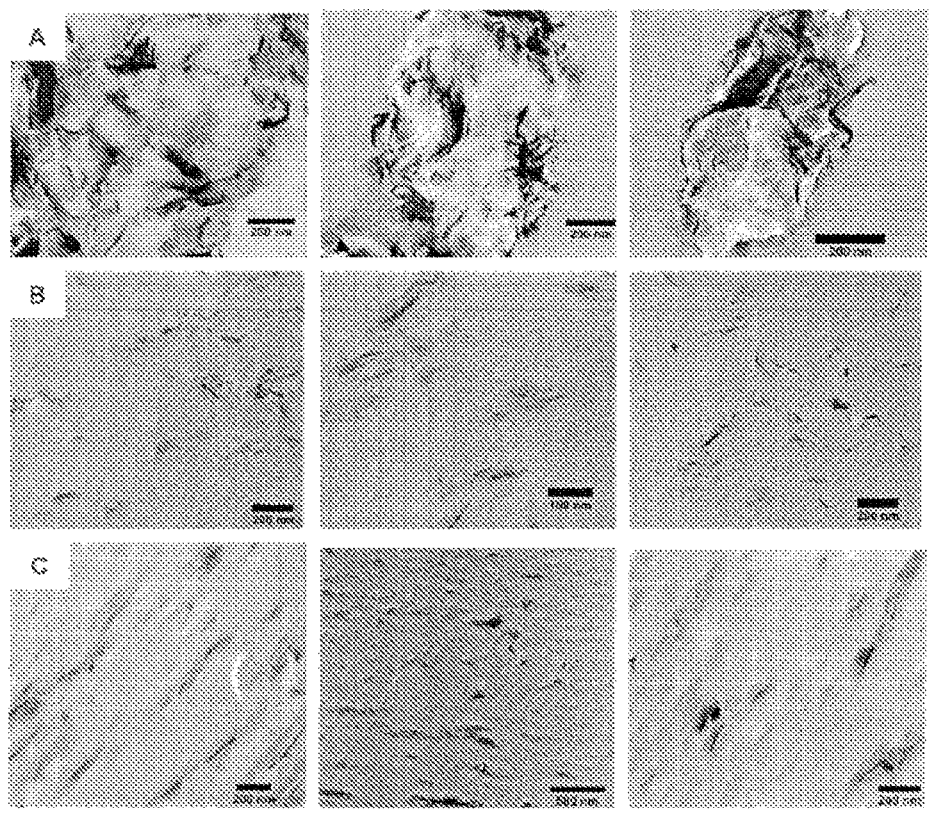
FIG. 16 depicts TEM micrographs taken at different magnifications of (A) (100/0)PS/SPS/Na-Mmt, (B) (90/10)PS/TeOc-SPS0.75/Mmt, and (C) (75/25)PS/TeDe-SPS0.75/Mmt.

For the intercalated nanocomposites, the intercalated regions were more prevalent near the primary particle-polymer boundary. This was also observed in organically modified Mmt. See Vaia et al. *Chem Mater* 8(11) 1996: 2628-35. The flexibility of the layers due to their large aspect ratio and nm-thickness is clearly demonstrated by their curvature observed in FIG. 15. Similar mixed morphologies of intercalated and exfoliated clay were also observed in the other PS/ionomer nanocomposites that were studied here. In contrast, when mixing only PS with the silicate, i.e., without the addition of any ammonium-neutralized ionomer, only large agglomerates or "tactoids" of clay were observed. This further corroborated the compatibilizing effect of the ionomers at dispersing Na-Mmt in these nanocomposites. The TEM micrographs shown in FIG. 16 compare the morphologies of the PS/SPS/clay nanocomposites. These images demonstrate the excellent nano to microscale dispersion of pristine Na-Mmt without the aid of any organic modification in the compounds containing the ammonium-neutralized ionomers.

Figure 17:
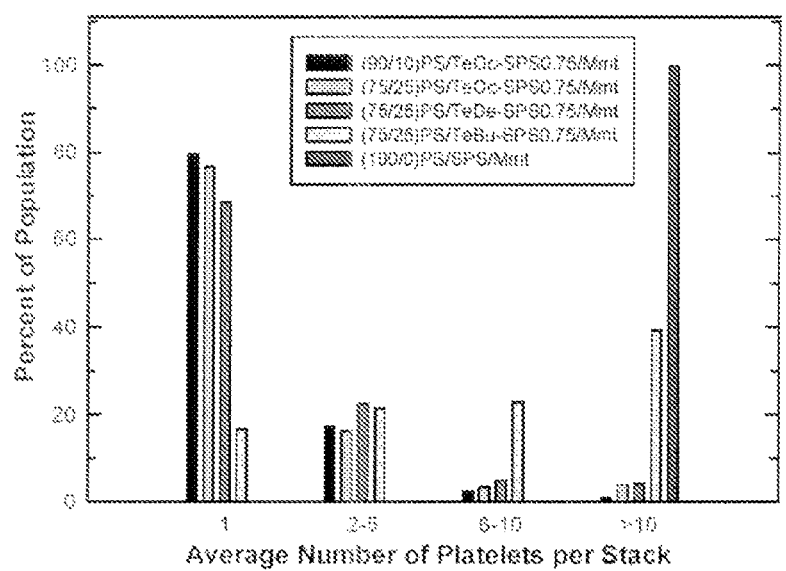
FIG. 17 depicts a histogram of the number of platelets per particle for the following blends: (a) (100/0)PS/SPS/Mmt, (b) (75/25)PS/TeDe-SPS0.75/Mmt, (c) (75/25)PS/TeOc-SPS0.75/Mmt, (d) (90/10)PS/teOc-SPS0.75/Mmt, and (e) (75/25) PS/TeBu-SPS0.75/Mmt.

Image analysis (15-20 images for each sample were analyzed) of the particles in the TEM micrographs was done to determine the distribution of silicate layers per particle. FIG. 17 shows a histogram of the distribution, broken up into single platelets, stacks of 2-5 layers, stacks of 6-10 layers, and stacks containing more than 10 platelets. Since all compounds contained the same amount of clay (3 wt %), the total number of single platelets and stacks reflects the degree of dispersion in these composites, i.e., the higher the number of platelets and stacks, the better dispersed and delaminated was the clay. (75/25)PS/TeOc-SPS0.75/Mmt, (90/10)PS/TeOc-SPS0.75/Mmt, and (75/25) PS/TeDe-SPS0.75/Mmt had a much larger percentage of single platelets than the (100/0) PS/SPS/Mmt composite. Depending on the percent contribution of single platelets, the various nanocomposites were classified as exfoliated/intercalated, or immiscible. The histogram for the (100/0)PS/SPS/Mmt composite had no tactoids smaller than 10 platelets, and that nanocomposite was considered to be immiscible. The ionomer-compatibilized nanocomposites exhibited 65-80% exfoliation depending on the counter-ion used to neutralize the ionomers, and those compounds were considered exfoliated/intercalated. Although the statistics for the compounds that used the TeOc and TeDe-ammonium ionomers are probably not significantly different to allow any conclusions as to the effect of the longer alkyl chain lengths of the counter-ion on exfoliation, both were significantly better at compatibilizing the clay than the TeBu-ammonium ionomer.

The lack of substantial exfoliation in the composites containing TeBu-SPS0.75 ionomer compared to the TeOc and TeDe salts suggested that an optimum level of interlayer separation was essential to achieve exfoliated morphologies. One might expect that nanocomposites with ionomers having quaternary counter-ions with shorter alkyl chains such as tetrabutyl ammonium would exchange easily with $Na^+$ in the intergalleries, but the smaller cation was also expected to provide the lowest reduction of the cohesive forces between adjacent platelets and, therefore, the smallest change in the gallery spacing. Without intending to be limited by theory, it is believed that the tetrabutyl ammonium ion between the galleries masked a relatively small amount of silicate surface from the polymer chain, which could have lead to more unfavorable contacts of the polymer chains with the silicate surface. The better degree of exfoliation (65-80%) using the TeOc- and TeDe-ionomers could have been due to the strong driving force for intercalation provided by ion exchange of $Na^+$ in the galleries with the quaternary ammonium ions on the polymer chain. The initial intercalation of the ammonium ions swelled the galleries, decreasing the interlayer interactions and thus facilitating the penetration by the polymer at the edges of clay particles.

EXAMPLE 11

Thermal Properties for Study B

Addition of an inorganic filler to a polymer can affect the thermal properties such as Tg and melting point.

The change in the heat capacity ($\Delta Cp$) for PLSNs at Tg can be reduced by the presence of inorganic clay particles. In this study, modulated DSC (MDSC) was used to provide better resolution and sensitivity of the changes in $\Delta Cp$, as other researchers have reported difficulties in detecting changes in Tg for clay nanocomposites using conventional DSC. Table 2 below compares transition temperatures for nanocomposites and PS/SPS polymer blends without clay.

TABLE 2

$T_g$ and $\Delta C_p$ values of filled and unfilled blends

| | Sample | | | | | | |
|---|---|---|---|---|---|---|---|
| | (75/25) PS/TeBu-SPS0.75/Mmt | | (75/25) PS/TeBu-SPS0.75/Mmt | | (75/25) PS/TeBu-SPS0.75/Mmt | | |
| wt % clay | 0 | 3 | 0 | 3 | 0 | 3 | 10 |
| $T_g$ (° C.) | 96.8 | 105.2 | 94.36 | 93.3 | 91.3 | 91.9 | 92.1 |
| Derivative heat capacity (J/g/° C./° C.) | 0.2045 | 0.247 | 0.2042 | 0.1935 | 0.214 | 0.193 | 0.149 |

For the same composition, different samples were run at least in triplicate. There was no substantial difference in the Tgs of the filled and unfilled systems, except for the (75/25) PS/TeBueSPS0.75/Mmt compound. This nanocomposite showed an increase in Tg of about 8-9° C. over the unfilled blend. Although the TEM images and WAXD results indicate that intercalation and partial exfoliation of the silicate layers occurred in both (90/10)PS/TeOc-SPS0.75/Mmt and (75/25) PS/TeDe-SPS0.75/Mmt nanocomposites, no changes in the Tg were observed for those compounds compared to the unfilled blends with the same polymer composition.

The addition of 3 wt % clay, whether it was intercalated, exfoliated, or not, had little or no effect on ΔCp of the PS/SPS blends and clay nanocomposites. However, when a higher silicate composition, 10 wt %, was used, i.e., the (75/25)PS/ TeOc-SPS0.75/Mmt-10 nanocomposite, ΔCp decreased, as shown in Table 2. The reduction of ΔCp for an amorphous polymer can be due to lower mobility of the polymer chains, which might be expected in the more highly loaded and exfoliated compounds.

EXAMPLE 11

Dynamic Modulus for Study B

Figure 18:
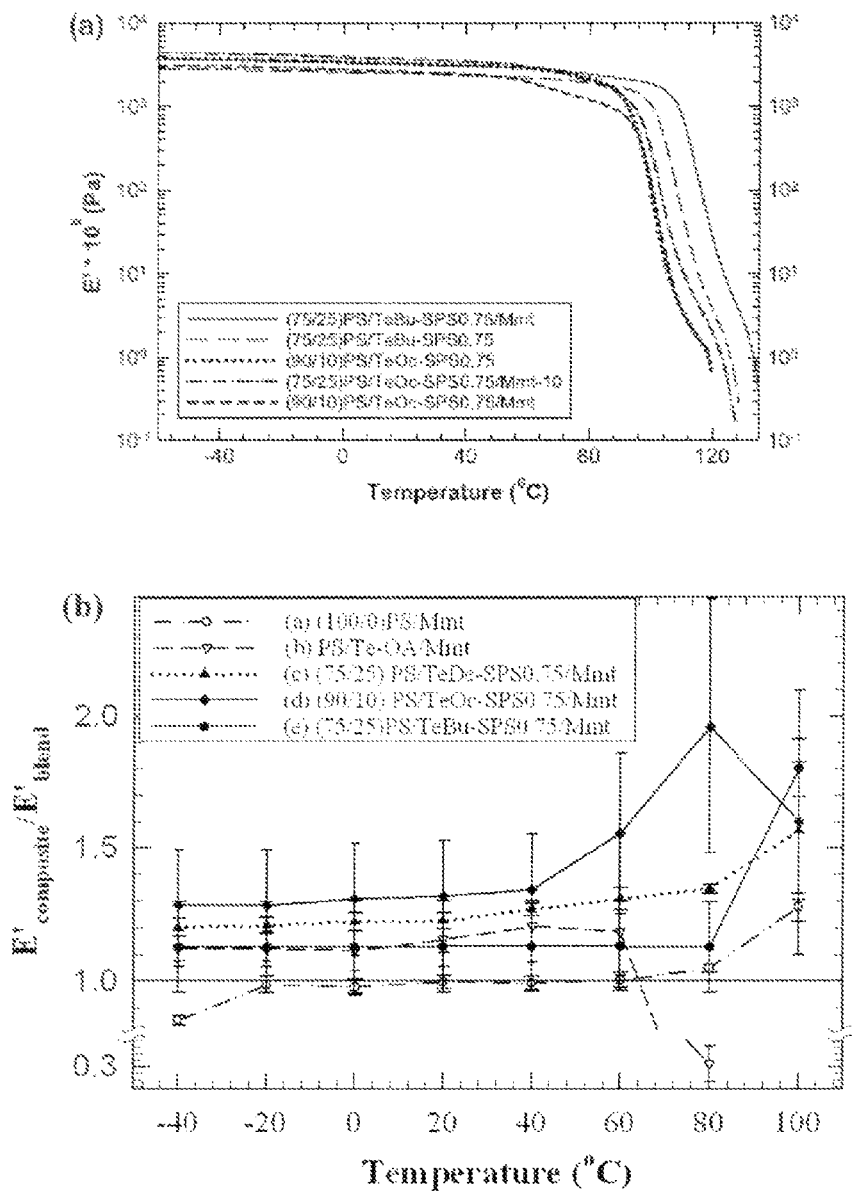
FIG. 18 depicts: graph (a) illustrating the dynamic storage moduli of PS/SPS/Mmt composites containing 3 wt % Mmt and the corresponding unfilled polymer blend as a function of temperature, and graph (b) illustrating the effect of temperature on the relative dynamic storage moduli ($E'_{composite}/E'_{blend}$) for the PS/SPS/Mmt composites.

Exfoliated polymer silicate systems generally exhibit higher mechanical properties than the unfilled polymer, in addition to maintaining optical clarity due to nanoscale dispersion of the silicate layers. The effect of silicate reinforcement caused by molecular dispersion of the silicate layers on the modulus of these compounds was probed using DMA. FIG. 18a compares dynamic storage modulus curves of (75/ 25)PS/TeBu-SPS0.75/Mmt and (90/10)PS/TeOc-SPS0.75/ Mmt with unfilled polymer blends. These unfilled polymer blends were prepared in the same way as the composites using DACA extruder, but without the addition of clay. The moduli of the PS/ionomer/clay nanocomposites were higher than those of the unfilled materials over the entire temperature range under investigation. This is seen more clearly from the ratio between storage modulus of the composite (E'composite) to the storage modulus of unfilled polymer blend (E'blend) as shown in FIG. 18a as a function of temperature.

Enhancement in the modulus was greater in the glass transition region and about Tg. The modulus enhancement below Tg was about 20-40%, while above Tg the improvement of the softer elastomeric matrix was as high as 90%. No improvement in stiffness was achieved in the immiscible blends of Na-Mmt in PS; in fact, the addition of the clay seemed to decrease the modulus. This may be a consequence of the poor and heterogeneous dispersion of the clay in PS. Data for a composite of PS/clay with the addition of a low molecular weight quaternary ammonium salt, Te-OA are also shown in FIG. 18b. That blend showed about a 10% modulus increase below the Tg, but the modulus dropped precipitously above 60° C.

Based on the foregoing examples for study B, the length of the alkyl chain length used on the quaternary ammonium counter-ions in sulfonated polystyrene ionomers plays a major role in the ability of the ionomer to intercalate and exfoliate Na-montmorillonite clays. When mixed with polystyrene, the alkyl ammonium-neutralized ionomers proved to be effective compatibilizers for the dispersion and exfoliation of the clay in the nanocomposites. The percentage exfoliation depended on the extent of the platelet separation caused by the quaternary ammonium ion, which exchanged with the Na+ in the intergalleries. No increase in Tg was observed for 60-80% ionomer/PS/clay nanocomposites with 60-80% of the clay exfoliated, but a nanocomposite wherein most of the clay was intercalated rather than exfoliated, i.e., (75/25)PS/ TeBu-SPS0.75/Mmt showed a 8-9° C. increase in Tg. The dynamic storage modulus increased with the addition of clay for all the compatibilized nanocomposites. The PS/clay nanocomposites exhibited no increase in modulus compared with the unfilled polymer. Of the quaternary salts studied here tetra-octyl ammonium appeared to provide the best balance of exfoliation and improvement in the properties of the blends.

As used herein, the terms "a" and "an" do not denote a limitation of quantity, but rather denote the presence of at least one of the referenced items. Moreover, the endpoints of all ranges directed to the same component or property are inclusive of the endpoint and independently combinable (e.g., "about 5 wt % to about 20 wt %," is inclusive of the endpoints and all intermediate values of the ranges of "about 5 wt. % to about 20 wt %,"). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. It is also to be understood that the disclosure is not limited by any theories described therein. Unless defined otherwise, technical and scientific terms used herein have the same meaning as is commonly understood by one of skill in the art to which this invention belongs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A polymer-clay composite composition comprising:
a non-metal salt of an ionomer; wherein the ionomer is carboxylated, sulfonated or phosphonated; and wherein the non-metal salt of the ionomer comprises a non-metal counter-ion selected from the group consisting of alkyl ammonium ions, quaternary ammonium ions, and phosphonium ions; and
a layered clay material; wherein the layered clay material is an unmodified clay;
wherein the unmodified clay is intercalated or exfoliated by the non-metal salt of the ionomer.

2. The polymer-clay composite composition of claim 1, wherein one or both of the layered clay and the non-metal salt of the ionomer is nanostructured.

3. The polymer-clay composite of claim 1, wherein the non-metal salt of the ionomer comprises repeat units represented by one of the following formulas:

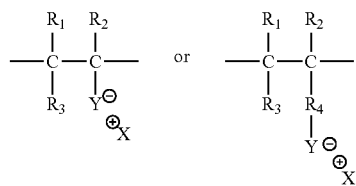

wherein each of the $R_1$, $R_2$, $R_3$ is an organic or oligomeric ligand or hydrogen, $R_4$ is an organic or oligomeric ligand, Y is a carboxylate, sulfonate, or phosphonate group, and $X^+$ is a non-metal counter-ion.

4. The polymer-clay composite of claim 1, wherein the layered clay material comprises montmorillonite, saponite, hectorite, mica, vermiculite, bentonite, nontronite, beidellite, volknoskoite, magadite, kenyaite, other silicates, or a combination comprising at least one of the foregoing clays.

5. The polymer-clay composite of claim 1, wherein a concentration of the layered clay material is about 0.1 weight % to about 30 weight % based on a total weight of the polymer-clay composite.

6. The polymer-clay composite of claim 1, wherein the ionomer is derived from polystyrene, a polyketone, a polyolefin, a polyester, a polyamide, polymethacrylate, a polysulfone, a polyimide, a polyether, a polysiloxane, a polyurethane, or a combination comprising at least one of the foregoing polymers.

7. The polymer-clay composite of claim 1, further comprising another polymer mixed with the non-metal salt of the ionomer and the layered clay material.

8. The polymer-clay composite of claim 7, wherein the another polymer comprises polystyrene, a polycarbonate, polymethacrylate, a polyamide, a polyester, polyvinyl chloride, polyvinylidene chloride, a polyolefin, a liquid crystalline polymer, a polyether, a polyimide, a polysulfone, a polyketone, an epoxy, a polysiloxane, a polyurethane, other organic polymers, or a combination comprising at least one of the foregoing polymers.

9. The polymer-clay composite of claim 1, having an ion exchange capacity to cation exchange capacity ratio greater than about 1.

10. A polymer-clay composite composition comprising:
a non-metal salt of an ionomer; wherein the ionomer is carboxylated, sulfonated or phosphonated; wherein the non-metal salt of the ionomer comprises a non-metal counter-ion selected from the group consisting of alkyl ammonium ions, quaternary ammonium ions, and phosphonium ions; and wherein the non-metal salt is a tetra-octyl ammonium salt, a tetra-decyl ammonium salt, or a combination comprising at least one or the foregoing salts; and
a layered clay material; wherein the layered clay material is an unmodified clay;
wherein the unmodified clay is intercalated or exfoliated by the non-metal salt of the ionomer.

11. An article of manufacture comprising the polymer-clay composite composition of claim 1.

12. An article of manufacture comprising the polymer-clay composite composition of claim 7.

13. A method of making a polymer-clay composite composition, comprising:
melt processing a mixture comprising:
a non-metal salt of an ionomer; wherein the ionomer is carboxylated, sulfonated or phosphonated; and wherein the non-metal salt of the ionomer comprises a non-metal counter-ion selected from the group consisting of alkyl ammonium ions, quaternary ammonium ions, and phosphonium ions; and
a layered clay material; wherein the layered clay material is an unmodified clay;
wherein the unmodified clay is intercalated or exfoliated by the non-metal salt of the ionomer.

14. The method of claim 13, wherein said melt processing is performed by extrusion, injection molding, compression molding, intensive mixing, or a combination comprising at least one of the foregoing processes.

15. The method of claim 13, wherein said melt processing comprises:
adding a portion of the non-metal salt of the ionomer to an extruder;
adding the layered clay material to the extruder after the non-metal salt of the ionomer is molten; and
adding another portion of the non-metal salt of the ionomer to the extruder.

16. The method of claim 13, wherein the mixture comprises another polymer.

17. The method of claim 13, wherein one or both of the layered clay material and the non-metal salt of the ionomer is nanostructured.

18. The method of claim 13, wherein the non-metal salt of the ionomer is represented by one of the following formulas:

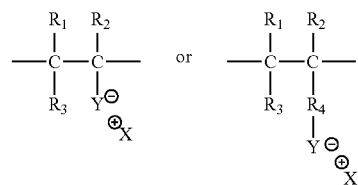

wherein each of the $R_1$, $R_2$, $R_3$ and $R_4$ is an organic or oligomeric ligand or hydrogen, Y is a carboxylate, sulfonate, or phosphonate group, and $X^+$ is a non-metal counter-ion.

19. The method of claim 13, wherein the layered clay material comprises montmorillonite, saponite, hectorite, mica, vermiculite, bentonite, nontronite, beidellite, volknoskoite, magadite, kenyaite, other silicates, or a combination comprising at least one of the foregoing clays.

20. The method of claim 13, wherein the ionomer is derived from polystyrene, a polyketone, a polyolefin, a polyester, a polyamide, a polymethacrylate, a polysulfone, a polyimide, a polyether, a polysiloxane, a polyurethane, a co-polymer comprising at least one of the foregoing polymers, or a combination comprising at least one of the foregoing polymers.

21. The method of claim 16, wherein the another polymer comprises polystyrene, a polycarbonate, polymethacrylate, a polyamide, a polyester, polyvinyl chloride, polyvinylidene chloride, a polyolefin, a liquid crystalline polymer, a polyether, a polyimide, a polysulfone, a polyketone, an epoxy, a polysiloxane, a polyurethane, other organic polymers, or a combination comprising at least one of the foregoing polymers.

22. The method of claim 13, wherein an ion exchange capacity of the non-metal salt of the ionomer is effective to form a polymer-clay composite having an ion exchange capacity to cation exchange capacity ratio greater than about 1.

23. The method of claim 13, wherein the non-metal salt is a tetra-octyl ammonium salt, a tetra-decyl ammonium salt, or a combination comprising at least one or the foregoing salts.

24. A polymer-clay composite composition made by a method comprising:
melt processing a mixture comprising:
a non-metal salt of an ionomer; wherein the ionomer is carboxylated, sulfonated or phosphonated; and wherein the non-metal salt of the ionomer comprises a non-metal counter-ion selected from the group consisting of alkyl ammonium ions, quaternary ammonium ions, and phosphonium ions; and a layered clay material; wherein the layered clay material is an unmodified clay;
wherein the unmodified clay is intercalated or exfoliated by the non-metal salt of the ionomer.

25. A polymer-clay composite composition comprising:
a non-metal salt of an ionomer; wherein the ionomer is carboxylated, sulfonated or phosphonated; wherein the non-metal salt of the ionomer comprises a non-metal counter-ion selected from the group consisting of alkyl ammonium ions, quaternary ammonium ions, and phosphonium ions; and wherein the non-metal salt of the ionomer comprises a phosphonium counter-ion; and
a layered clay material; wherein the layered clay material is an unmodified clay;
wherein the unmodified clay is intercalated or exfoliated by the non-metal salt of the ionomer.

26. The polymer-clay composite of claim 3, wherein Y is a sulfonate group.

27. The polymer-clay composite of claim 3, wherein Y is a phosphonate group.

28. A polymer-clay composite composition comprising:
a non-metal salt of an ionomer; wherein the ionomer is carboxylated, sulfonated or phosphonated; and wherein the non-metal salt of the ionomer comprises a non-metal counter-ion selected from the group consisting of alkyl ammonium ions, quaternary ammonium ions, and phosphonium ions; wherein the non-metal salt of the ionomer comprises repeat units represented by one of the following formulas:

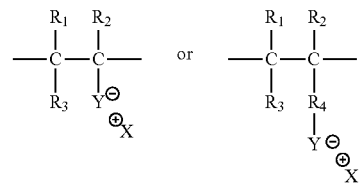

wherein each of the $R_1$, $R_2$, $R_3$ is an organic or oligomeric ligand or hydrogen, $R_4$ is an organic or oligomeric ligand, Y is a carboxylate, sulfonate, or phosphonate group, and $X^+$ is a non-metal counter-ion; and wherein $X^+$ is selected from the group consisting of butyl ammonium, dibutyl ammonium, tributyl ammonium, octyl ammonium, tetra-octyl ammonium, tetra-decyl ammonium, and phosphonium ions; and
a layered clay material; wherein the layered clay material is an unmodified clay;
wherein the unmodified clay is intercalated or exfoliated by the non-metal salt of the ionomer.

29. The polymer-clay composite composition of claim 1, consisting of the non-metal salt of an ionomer and the layered clay material.

30. The polymer-clay composite of claim 1, wherein the ionomer is derived from polystyrene, a polyketone, a polyolefin, a polyester, a polyamide, a polysulfone, a polyimide, a polyether, a polysiloxane, a polyurethane, or a combination comprising at least one of the foregoing polymers.

31. The polymer-clay composite composition of claim 24, wherein the mixture consist of the non-metal salt of an ionomer and the layered clay material.

* * * * *